United States Patent Office 3,006,868
Patented Oct. 31, 1961

3,006,868
METHOD OF PRODUCING FOAMED RUBBERS
Paul Stamberger, Baltimore, Md., and Walter M. Fuchs, Aachen, Germany; Frieda W. Fuchs, sole heir and sole personal representative of said Walter M. Fuchs, deceased, said Frieda W. Fuchs, assignor to Crusader Chemical Co., Inc., New York, N.Y., a corporation of New York
No Drawing. Filed Aug. 30, 1957, Ser. No. 681,185
8 Claims. (Cl. 260—2.5)

This invention relates to the preparation of natural and synthetic rubber sponges, and has as its object the production of sponge rubber of good texture and minimum shrinkage from foamed latices, by the use therein, as auxiliary gelling agents, of salts of soap forming acids, with quaternary ammonium radicals containing at least one long chain substituent having more than 10 carbons.

The production of foamed latex sponge rubber of good texture and low shrinkage is a problem which requires considerable skill no matter how it is done. The skill required is increased when the simplest foaming method is used—the beating of air into a rubber latex followed by gelation, either by heat or by adding to the foamed latex a delayed action gelling agent which causes a lowering of pH as it hydrolyzes (e.g. the alkali metal salts of silicofluoric acids). It is essential, in getting good sponge, that the latex be gelled into a solid before the foam is broken; otherwise shrinkage of the foam occurs, and density increases or the foam collapses. At the same time texture is coarsened, and the usefulness of the sponge reduced. This means that gelling should occur before the pH is lowered by the influence of the delayed action gelling agent to the point where the soap bubbles of the foam start to break. Sometimes secondary gelling agents are used, but known secondary gelling agents require storage at very low temperatures, and, despite all precautions taken, cause some difficulties, require additional processing, and are substantially less effective in stabilizing foams than the products of this invention.

We have discovered that water insoluble quaternary ammonium salts of soap forming acids (including long chain fatty acids, having 12 or more carbon atoms, and rosin acids—abietic acid, hydrogenated and disproportionated rosin acids, etc.) where the quaternary ammonium radicals have at least one substituent comprising a long chain having more than 10 carbon atoms, have the unique property of dissolving in solutions of soaps of the soap forming acids and acting in such fashion, on being mixed into latices, that the foamed latices will gel, either with heat or with delayed action gelling agents, before the foam collapses. This results in sponges of superior texture and lower gravity, with minimum difficulty.

The positively charged quaternary ammonium ions, bearing a long chain radical, which are used to make the salts with fatty acids, are gellants for negatively charged latices like those of natural and synthetic rubbers; it is probable that in the complex system used for foam rubber manufacture by the action of heat, or by the action of the pH change in the delayed action gelling agent, the quaternary ammoniums, incooperative during normal storage conditions, acts as the actual gelling agent for the latex compound.

The resultant sponges have another advantage over conventional sponges—because of the presence of the quaternary ammonium compounds, they have germicidal properties.

The quaternary ammonium compounds which may be used to produce the water-insoluble soaps are characterized by having at least three of the four available bonds of the quaternary nitrogen attached to carbon, one of these carbons being part of a chain of more than 10 carbon atoms. The carbons may be separate alkyl chains, or part of a heterocyclic ring. As typical examples, we have used cetyl-dimethyl-benzyl-ammonium chloride, trimethyl-cetyl-ammonium bromide, diisobutyl phenoxy ethoxy ethyl-dimethyl-benzyl-ammonium chloride, 9 octadecenyl-dimethyl-ethyl-ammonium chloride, dodecyl-dimethyl-o chlor benzyl-ammonium chloride, dodecyl-dimethyl-benzyl-ammonium chloride, p tertiary octyl phenoxy ethyl-dimethyl-benzyl-ammonium chloride, myristoyl ethyl-dimethyl-benzyl-ammonium halide, 1 hydroxyethyl-2 tetradecyl-3 benzyl ammonium chloride, N-benzyl-N higher alkyl (more than 10 carbon atoms) morpholinium halides, N alkyl-dialkyl-imidazolinium chloride (with the long chain substituent preferably on the ring, and not on the active nitrogen), the N-lauryl-methyl pyridinium chlorides, and N-lauryl-quinolinium bromide.

Any soap forming acid can be used, including fatty acids having 12 or more carbon atoms, and rosin and rosin derivatives such as hydrogenated and disproportionated rosin. Specific acids include saturated fatty acids (e.g. lauric, palmitic, stearic etc.) unsaturated fatty acids (e.g. oleic, linoleic, linolenic, etc.) natural mixtures of fatty acids derived from fats and oils (e.g. from beef fat, cottonseed oil, soya oil, coconut oil, and the mixed rosin fatty acids complexes known as tall oil).

Our water insoluble salts of soap forming acids can be made by carrying out a metastatic reaction between the quaternary ammonium compound and the acid. Either the halogen salt of the quaternary ammonium compound can be used with an alkali metal salt of the soap-forming acid, or the free hydroxide of the quaternary ammonium compound and the free acid can be used. By taking stoichometric quantities an insoluble precipitate forms in water, from which the water can be decanted. Such an insoluble precipitate cannot be distributed in the latex easily, except by prior emulsification; our preferred method is to solubilize this precipitate in excess surface active agent, such as a solution of soap (K, Na or $NH_4$ soap in water) for example in a 10% solution. The amount of soap or soap solution required can be determined by experiment by agitating the precipitate suspended in water and adding as much soap solution to it as needed to produce a uniform solution, which is generally slightly opaque. The reaction can be carried out without separating the precipitate, and the precipitate solubilized subsequently with a soap solution. Generally the amount of soap necessary to produce a satisfactory solution is in excess of one equivalent. Excess soap can be used without adverse effect on the final processing of the foam latex compound, since such excess can be deducted from the soap in the formula.

It should be noted that one acid can be used in the quaternary salt (e.g. lauric acid, rosin) while a different acid can be used in the soap to dissolve it (e.g. rosin, stearic acid).

Typical of our invention are the following specific examples:

*Example 1.—Natural rubber latex*

To a natural rubber latex containing 0.7% $NH_3$ was added a 15% potassium oleate solution, and the latex deammoniated by blowing air at 80° F. over the surface for 40 hours: the resulting latex contained 0.2% $NH_3$ and 0.5% potassium oleate. 163 pounds of this deammoniated latex, containing 100 pounds of rubber solids, was further compounded with a slurry consisting of:

| | Lb. |
|---|---|
| Sulfur | 2 |
| Zinc salt of mercaptobenzothiazol | 1.5 |
| Zinc salt of diethyldithiodicarbamic acid | 0.5 |
| Antioxidant | 1 | previously ground in a solution consisting of 5 pounds of water to which was added 1½ ounces of Darvan 1 (sodium salt of polymerized alkyl aryl sulfonic acid—Dewey and Almy Chemical Co.) by pouring the slurry into the latex. A further 13 pounds of 15% potassium oleate solution was added. This latex ready for foaming contained 57% solids.

*Example 1A.—No addant*

100 grams of the latex compound was placed in a conventional Hobart type beater; at a temperature of 70° F. a foam volume of five times the original was reached in 10 minutes. After this 10 grams of a 50% dispersion of zinc oxide in water was mixed in; at this time the speed of the beater was lowered, to prevent further volume increase. In two minutes the zinc oxide was evenly distributed in the compound and 8 grams of a 15% dispersion of sodiumsilicofluoride was mixed in the foam. After two minutes additional mixing the content of the beater was emptied in a mold. In 4 minutes the foam began to collapse and in 5 minutes time gelling was started but the collapse continued and finally a flat somewhat porous slab formed, which was useless as a foamed sponge.

*Example 1B*

The same procedure was followed as in Example 1A, except before foaming a 15% solution of benzyl trimethyl ammonium chloride was added to 100 grams of the latex. The results varied slightly with the quantity added, as follows:

Quantity, ml.:    Result
4_____ Collapse.
6_____ Collapse.
8_____ Partial collapse.
12_____ No foam volume could be obtained.

This example indicated that short chain quaternary ammonium salts are not effective to produce our results.

*Example 1C*

Instead of the benzyl trimethyl ammonium chloride a 15% solution of dodecyl trimethyl ammonium chloride was added. When the addition was carried out by pouring the total quantity into the latex mixture local coagulation occurred; hence the solution was added during a 2 minutes interval slowly with effective agitation.

| Quantity, ml. | Gel time, min. | Result |
|---|---|---|
| 4 | 6 | Good foam slightly coarse texture. |
| 6 | 4 | Excellent texture. |
| 8 | 1½ | Fair texture. |

In all cases the shrinkage was below 10%.

By reducing the sodium-silico fluoride addition to 4 grams when 8 ml. of the dodecyltrimethyl ammonium chloride solution was added, a 6 minute gel time was obtained and a better texture.

*Example 1D*

To 100 lbs. 15% potassiumoleate solution of pH 10.5, 12 lbs. dodecyltrimethyl ammonium chloride was added. First a precipitate formed which went into solution on stirring finally a turbid solution of low viscosity resulted. This solution could be mixed with natural or synthetic latex without local or total coagulation in any proportion.

The same formula and procedure was used again as in Example 1B, except the above solution of the soap solubilized dodecylbenzyl ammonium oleate was added in various quantities. The foaming temperature was 70° F. (measured in the latex after the foam volume was reached).

| Quantity, ml. | Gel time, min. | Result |
|---|---|---|
| 2 | 7 | Partial collapse. |
| 4 | 6 | Fair foam, 20% shrinkage. |
| 6 | 5½ | Fair foam, shrinkage 14%. |
| 8 | 4 | Good foam, shrinkage 10%. |
| 10 | 3 | Excellent foam, shrinkage 8%. |

The addition of the sodium silicofluoride was reduced to 5 grams in the formula and with the addition of 8 ml. of the solubilized dodecyltrimethyl ammonium oleate gelling was obtained in 6 minutes resulting in an excellent foam sponge with fine texture.

All the samples after gelling, were cured for 30 minutes at 212° F. in boiling water, the excess water squeezed out by passing the slab through a roller and the sponge was dried over night at 170° F.

The temperatures of the various latices during foaming were kept as close as possible at 70° F.

When up to 40% of the natural rubber hydrocarbon was substituted with synthetic rubber latex, such as a polybutadiene latex made by the low temperature polymerization process (a 60% solids containing water dispersion, such as Pliolite Latex 2104 marketed by the Goodyear Tire & Rubber Co.), the same behavior was observed. The use of the long chain quaternary fatty acid salts improved the processing behavior and made it possible to obtain a useful foam sponge when such product could not be obtained without the addition of the product mentioned above.

*Example 2.—Neoprene latex*

A polychloroprene (Neoprene Latex Type 60, manufactured by the E. I. du Pont de Nemours and Company) was used. The formula for the foam compound was as follows:

The neoprene latex had a solid content of 60%; all other ingredients but the soap were added as 50% water dispersions or solutions.

Neoprene latex, 166 parts water dispersion 100 pts. solids.
Castor oil sodium soap (20% sol.), 10% parts water dispersion 2 pts. solids.
Zno, 4 parts water dispersion 2 pts. solids.
Antioxidant, 4 parts water dispersion 2 pts. solids.
Sulfur, 4 parts water dispersion 2 pts. solids.
Tepidone (sodium dibutyldithiocarbamate), 3 parts water dispersion 1.5 pts. solids.
Hydrated alumina, 20 parts water dispersion 10 pts. solids.

The solid content of the compound was 52%, the pH 10.8.

100 grams of this compound was again foamed in a Hobart beater and after the foam volume of 5 times the original obtained, the gelling agent—7 ml. of a 20% dispersion of sodium silico fluoride—was added. The foam temperature was 75° F. The mixing time with the gelling agent was again 2 minutes at a low speed. After the foam was poured out into a container it set in 8 minutes, showing considerable shrinkage and quite a concave surface; the shrinkage thus could not be determined accurately, but was in excess of 30%.

*Example 2A*

The same compound was used as in Example 2. A solution of the quaternary ammonium compound was prepared as follows:

415 parts by weight of octadecyl benzyl dimethyl ammonium chloride was dissolved in 2000 parts of water. To this a solution of 305 parts sodium oleate in 1000 parts water was added a precipitate was formed which went into dispersion by adding a solution of 600 parts sodium oleate in 1000 parts of water. The solution had a solid content of 24.5%.

To 100 grams of the neoprene latex compound, 10 ml. of the solution of the quaternary salt was added before foaming. Otherwise the foaming and gelling procedure was the same as in Example 2. Solidification by gelling took place in 6 minutes and a foam resulted with no shrinkage on the surface and with a total shrinkage of 17% only.

*Example 3.—Heat gelation*

100 grams of latex compound as in Example 1 was mixed with 3 ml. 20% solution ammonium nitrate and foamed up, during the foaming operation 10 grams of a 50% ZnO dispersion was added and continued to be mixed in the beater for 5 more minutes, after this 2 ml. of a 20% dispersion of potassium silico fluoride was added and the contents of the beater poured into a mold. The mold content was heated to 170° F., the foam began to collapse in 10 minutes. No useful product could be obtained. The remaining latex foam which slowly collapsed in the beater remained liquid for 8 hours at room temperature.

*Example 3A*

When 20 grams of the quaternary ammonium compound solution in Example 2A was added, the foam when heated to 170° F. solidified without any change in 10 minutes and after cure it showed good texture and a shrinkage of only 14%.

*Example 4.—Natural rubber with rosin salt*

10 parts of rosin was dissolved in water containing 3 parts of KOH; a turbid viscous solution resulted. 5 parts of lauryl benzyl dimethyl ammonium chloride was added to this solution. A precipitate formed initially which went on continuous stirring into solution or dispersion. A thin yellow somewhat turbid solution resulted. The pH of the solution was 9.8.

The same formula was used as in Example 1D. 4 ml. of the above solution and 4 grams of sodium silicofluoride solution gelled the latex foam in 7 minutes and a dense texture with good foam sponge characteristics resulted.

In all the examples, the temperature of the latex during the foaming operation was kept at 70° F., the conventional temperature used for batch foaming operations. With continuous foamers, like the Oakes machine, the conventional entering temperature is 65° F., since some heating occurs in the machine. These temperatures are not critical. However, as the temperature is lowered, gel times become larger, while higher temperatures speed up gel time and increase shrinkage. Hence, we prefer to operate in the range of ordinary ambient temperatures.

The examples could be multiplied indefinitely, since the process is applicable to any latex which can be gelled by the action of sodium silico fluoride. Such latices, are characterized by being negatively charged, and are generally made with water soluble soaps as the emulsifying agents (the alkali metal and ammonium salts of fatty acids and/or rosin or tall oil). Natural rubber, polybutadiene and polychloroprene latices available on the market are generally of this type; many of the butadiene-styrene copolymer latices, and the butadiene-acrylonitrile copolymer latices, are of this type and all of these can be used in our process. It should be noted that the chemical composition of the elastomer is not of any moment in regard to the instant invention. What is important is that the latex be capable of coagulation by sodium silicofluoride. Thus, while none of the commercially available butyl rubber latices are of the indicated types, the invention would be useful with butyl rubber if a butyl rubber latex of the indicated type was prepared.

While the examples show the use of silico-fluorides as the primary gelling agent, these can be replaced by other salts which hydrolyze in the system, such as ammonium sulfate and nitrate; and the process may be used; as in Example 3A, with compositions which will not gel except when heated.

The method can obviously be used to distribute the quaternary ammonium compound through a rubber article which is not foamed, as well as through a foamed article.

This application is a continuation in part of our application Serial Number 401,735, filed December 31, 1953, which in turn is a continuation-in-part of our application Serial Number 70,805, filed January 13, 1949.

We claim:

1. In the method of preparing a foamed latex sponge rubber article wherein air is beaten into a negatively charged rubber latex dispersion so as to form a foam and the foam is then gelled to a solid with an alkali metal silico-fluoride gelling agent, the improvement which consists in increasing the speed of gelation and decreasing the tendency of the foam to shrink on gelation by thoroughly mixing into the latex dispersion, prior to foaming, a stable aqueous dispersion of a water insoluble germicidal quaternary ammonium salt of an acid selected from the group consisting of rosin acids and the saturated and unsaturated soap-forming acids containing from 12 to 18 carbon atoms which organic quaternary ammonium compound is further characterized by having at least three carbon atoms directly bonded to the quaternary nitrogen atom, one of said carbon atoms being part of an aliphatic chain of at least ten carbon atoms.

2. The method according to claim 1 in which the water insoluble germicidal quaternary ammonium salt is prepared by reacting at least a stoichiometric amount of (1) a compound from the class consisting of rosin acids, saturated and unsaturated soap-forming acids containing from 12 to 18 carbon atoms, and alkali metal salts of said acids, with an equivalent weight of (2) a compound selected from the group consisting of quaternary ammonium hydroxides and halides which are characterized by having at least three carbon atoms directly bonded to the quaternary nitrogen atom, one of said carbon atoms being part of an aliphatic chain of at least ten carbon atoms, and the insoluble salt so formed is then agitated with water and an anionic surfactant dispersing agent whereby a stable aqueous dispersion of the salt is formed.

3. The method according to claim 2 in which an alkali metal salt of the acid reactant is added in substantial excess whereby the excess functions as the dispersing agent for the insoluble quaternary ammonium salt produced.

4. The method according to claim 1 in which the quaternary ammonium salt is dodecyltrimethyl ammonium oleate.

5. The method according to claim 1 in which the quaternary ammonium salt is dodecylbenzyl ammonium oleate.

6. The method according to claim 1 in which the quaternary ammonium salt is octadecyl benzyl dimethyl ammonium oleate.

7. The method according to claim 1 in which the quaternary ammonium salt is lauryl benzyl dimethyl ammonium rosinate.

8. The method according to claim 1 in which the rubber latex is a negatively charged rubber selected from the group consisting of natural rubber, polychloroprene rubber and polybutadiene rubber.

References Cited in the file of this patent

UNITED STATES PATENTS

| | | |
|---|---|---|
| 2,321,111 | Stamberger | June 8, 1943 |
| 2,809,173 | Dereniuk | Oct. 8, 1957 |
| 2,822,338 | Hay | Feb. 4, 1958 |

OTHER REFERENCES

Noble: "Latex in Industry," 2nd edition, Copyright 1953, pp. 355–357, published by Rubber Age, New York.